(No Model.) 3 Sheets—Sheet 1.

C. L. DIRCKX.
CORN HARVESTING MACHINE.

No. 348,154. Patented Aug. 24, 1886.

WITNESSES
Franck L. Ouraud
Wm. Fecker

Charles L. Dirckx
INVENTOR
By Louis Bagger & Co
Attorneys.

(No Model.)  3 Sheets—Sheet 2.
C. L. DIRCKX.
CORN HARVESTING MACHINE.
No. 348,154. Patented Aug. 24, 1886.
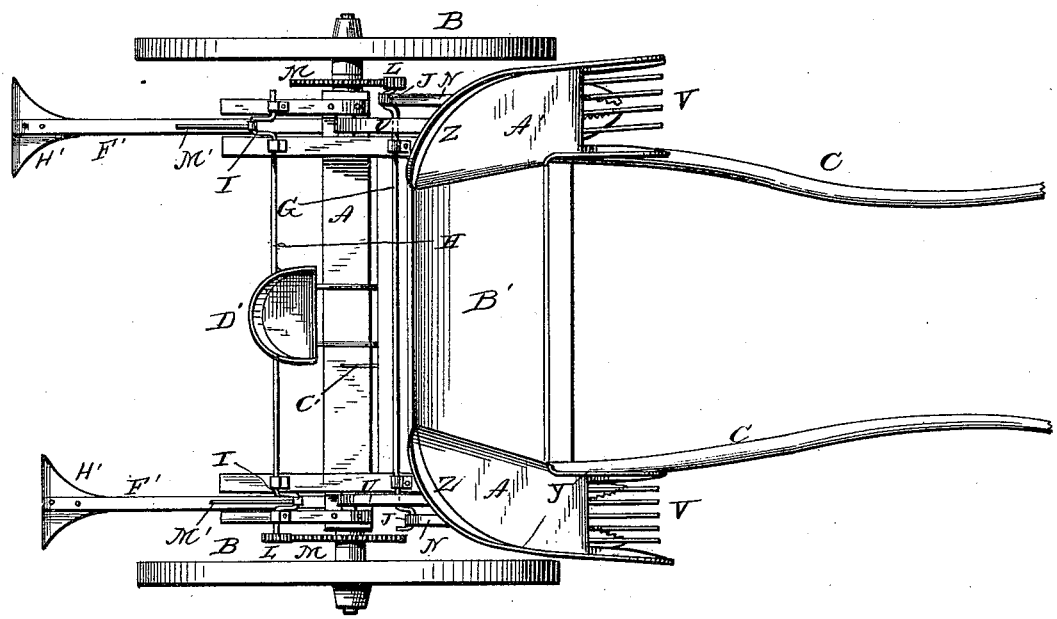
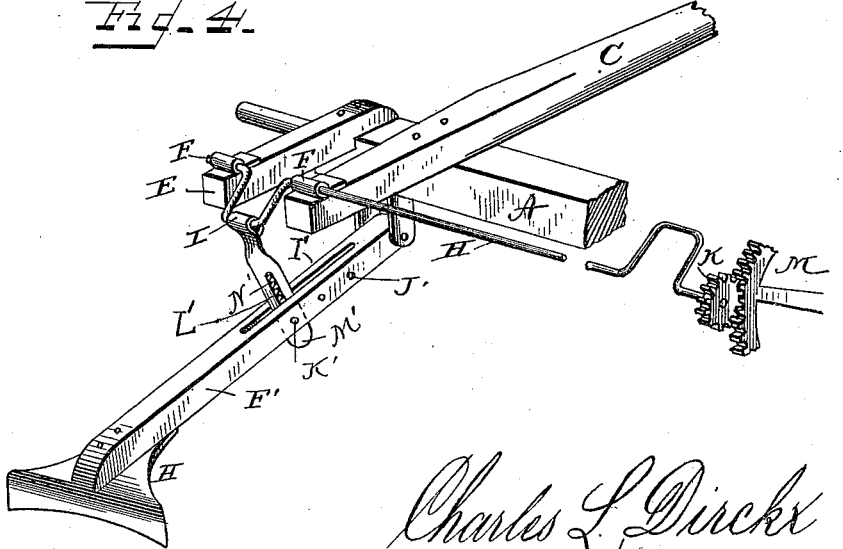
WITNESSES
Charles L. Dirckx
INVENTOR
By Louis Bagger & Co.
Attorneys

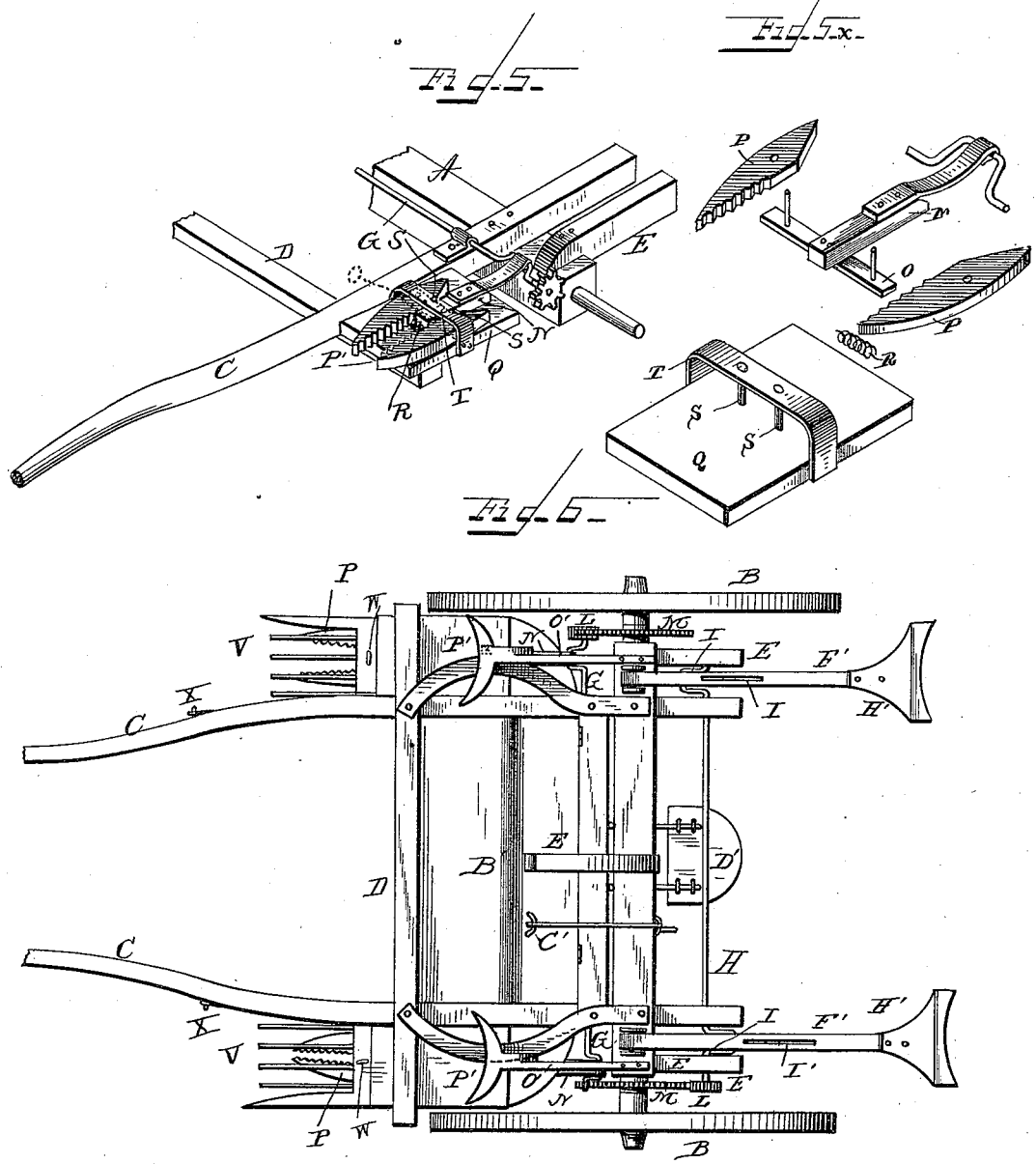

UNITED STATES PATENT OFFICE.

CHARLES LOUIS DIRCKX, OF TAOS, MISSOURI.

CORN-HARVESTING MACHINE.

SPECIFICATION forming part of Letters Patent No. 348,154, dated August 24, 1886.

Application filed September 12, 1885. Serial No. 176,947. (No model.)

*To all whom it may concern:*

Be it known that I, CHARLES LOUIS DIRCKX, a citizen of the United States, and a resident of Taos, in the county of Cole and State of Missouri, have invented certain new and useful Improvements in Corn-Harvesting Machines; and I do hereby declare that the following is a full, clear, and exact description of the invention, which will enable others skilled in the art to which it appertains to make and use the same, reference being had to the accompanying drawings, which form a part of this specification, and in which—

Figure 1:
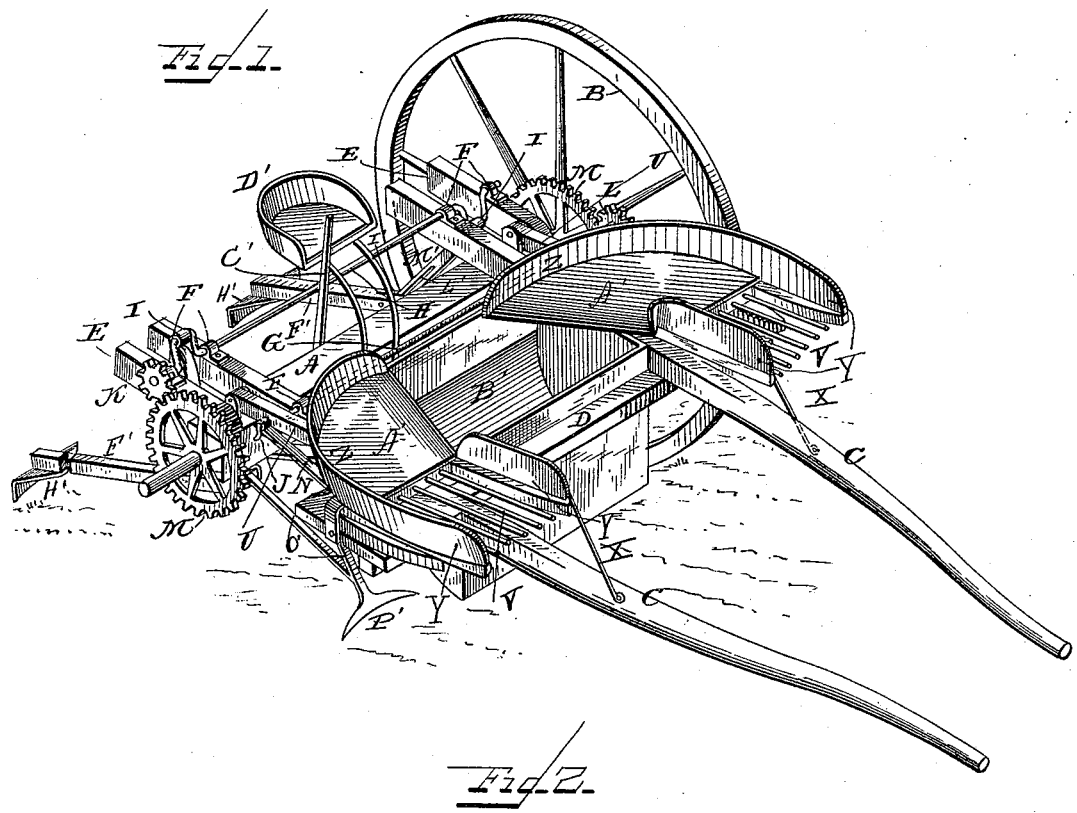
Figure 2:
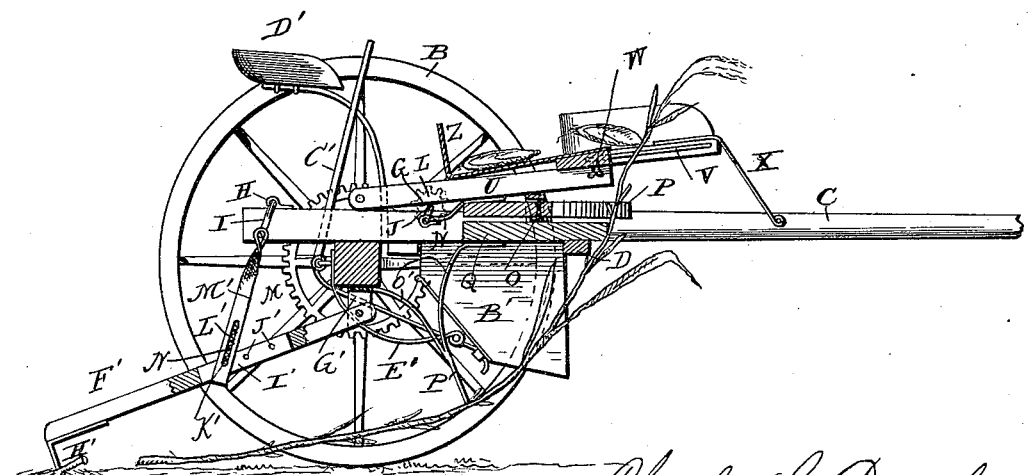

Figure 1 is a perspective view of my improved machine for harvesting corn. Fig. 2 is a longitudinal vertical section of the same. Fig. 3 is a top view of the machine. Fig. 4 is a perspective detail view of the hoe-operating mechanism. Fig. 5 is a similar view of the stalk-holding tongs. Fig. 5˟ is a like view of the same, showing the several parts separated, and Fig. 6 is a bottom view of the entire machine.

Similar letters of reference indicate corresponding parts in all the figures.

My invention has relation to machines for gathering the ears of corn from off the stalks, and thereupon cutting the stalks; and it consists in the improved construction and combination of parts of the same, as hereinafter more fully described and claimed.

In the accompanying drawings, the letter A indicates an axle, upon the spindles of which are journaled two wheels, B B, and which has the inner ends of the shafts C secured to its upper side, the said shafts being connected by a cross-piece, D. Two longitudinal pieces, E E, are secured to the upper side of the axle, near the ends of the same, and are provided with transverse bearings F, in which transverse crank-shafts G and H are journaled, the said shafts having double cranks I I and J J at each end. The shafts are provided at opposite ends with pinions K and L, which are preferably so secured upon the shafts that they may be allowed to turn upon the shafts when desired, and these pinions mesh with cog-wheels M, one upon each wheel. The shafts are secured, respectively, one forward of the axle and one to the rear of the axle, and the forward shaft, which is lettered G, has two connecting-rods, N N, pivoted to its cranks. The forward ends of these connecting-rods are pivotally secured to cross-pieces O, upon the ends of which the jaws P P of two tongs are pivoted, said cross-pieces, with their tongs, sliding upon plates Q, secured at the ends of the cross-piece connecting the shafts or thills. The jaws of the tongs are held apart at their forward ends by a spring, R, and the inclined rear inner edges of the jaws slide against pins S upon the plate, which pins are connected at their upper ends by a cross-piece, T, and which rollers serve to force the jaws together when drawn back by the connecting-rod.

Two arms, U U, are pivoted or hinged to the upper side of the axle, and forks V are secured to the forward ends of these arms, the said forks having their middle teeth, W, secured in the fork-frame by means of set-screws. These forks rest normally above the tongs, and are held in position by means of rods X, secured to the outer ends of the innermost teeth and to the thills. Flanges Y Y are secured upon the innermost and outermost teeth of the forks, and the outer flanges are continued in a curved flange, Z, around the edges of two plates, A′ A′, secured to the frames of the forks, and upon the upper sides of the arms, and the said plates have their inner edges curved downward into a box, B′, secured between the thills behind the cross-piece. The rear side of this box is hinged near its upper edge, and the box is formed with a hand-lever, C′, which is pivoted upon the axle, within reach of the driver from his seat D′, and connected with the hinged side, so that by tilting the lever forward the side will open. A spring, E′, is secured at its upper end to the axle, and bears with its lower end against the outside of the hinged side of the box, keeping it closed.

Hoe handles or arms F′ are pivoted in stirrups G′ upon the under side of the axle, and have hoe-blades H′ at their rear ends, the said blades having their lower edges curved and sharpened. The hoe-handles have slots I′ near their inner ends, and a number of transverse perforations, J′, through which pass pins K′, which pass through longitudinal slots L′ in pitmen M′, pivoted at their upper ends to the cranks upon the rear shaft. Spiral springs N′ are secured at their upper ends to the pitmen at the upper ends of the longitudinal slots, and at their lower ends they bear against the hoe-arms, so as to cushion the stroke of the hoes.

It will be seen that by revolving the crank-shaft the hoes will be raised and dropped, so that they will cut off any cornstalks which are held in a downwardly-bent position.

Two branching braces, O', are attached, one at each side of the machine, by securing one branch of each brace to the axle and the other branch to one of the plates Q, the branches of each brace being united at their lower ends into a downwardly-projecting bar, which is provided at its lower end with a cross-piece, P', which will serve to press the cornstalks down.

It will now be seen that as the machine is propelled in the field, with the forks stripping two rows, the stalks will be grasped by the forks and stripped of their ears, which will travel upon the plate behind the forks and be dropped into the box or corn-receptacle. The stalks will now be grasped by the tongs, which will hold them and allow the cross-pieces P', which serve as breakers, to force the stalk down and break it near the roots, when the hoes will cut the stalks, which will be released by the tongs. In this manner the ears will be gathered into the corn-receptacle, which may, when full, be opened, allowing the ears to fall upon the ground in heaps, where they may be husked and loaded upon wagons and hauled to the crib. The ears will thus be stripped off the stalks gathered into heaps, and the stalks will be cut, thus clearing the field by passing over it once and saving a great amount of time and labor, and the machine is simple of construction, so as to render it strong and durable, and at the same time render it inexpensive of manufacture and within reach of almost all farmers.

When the machine is transported from one place to another, and it is not desired to have the hoes and tongs in operation, the pinions may be brought out of gear with the cog-wheels by simply sliding them upon the shafts, they being provided with any suitable means of attachment to the shafts, so that they may be secured, or allowed to be loose, as desired; or the pinions may be provided with set-screws, which will secure them to the shaft when screwed toward the shaft, but which will allow the pinions to turn upon the shaft when loosened. The forks may be thrown back after unfastening the rods which secure them to the thills, when they will be out of the way, and they will at the same time balance the weight of the device more suitably for transportation, taking the weight off from the horse.

Having thus described my invention, I claim and desire to secure by Letters Patent of the United States—

1. A machine for gathering the ears and chopping the stalks of corn, consisting of a frame mounted on wheels and having forwardly-projecting stripping-forks, forwardly-projecting tongs for grasping the stalks, downwardly-projecting stalk breakers or benders, and cutting-hoes at the rear of the machine, as and for the purpose shown and set forth.

2. In a machine for gathering the ears and chopping the stalks of corn, the combination of forwardly-projecting stripping-forks having flanges at their sides, plates or tables having a curved flange at their outer edges and having a downwardly-inclined inner edge, and a box or receptacle placed between the tables and having a hinged side, and a lever for opening the said side, as and for the purpose shown and set forth.

3. In a machine for gathering the ears and chopping the stalks of corn, the combination of tongs for holding the stalks, downwardly-projecting breakers, hoe arms secured pivotally to the axle of the machine, and having hoes at their rear ends and longitudinal slots near their pivoted ends and provided with transverse perforations, bolts passing through the said perforations, pitmen pivoted to revolving crank-shafts and having longitudinal slots at their lower ends sliding upon the bolts, and springs bearing against the hoe-arms and secured at the upper ends of the slots of the pitmen, as and for the purpose shown and set forth.

4. In a machine for gathering the ears and chopping the stalks of corn, the combination of the frame having the gathering-box, the grasping-tongs secured in front of the axle, drive-wheel, shaft, pinion, and connecting-rods for operating said tongs, and stripping-forks having their arms pivoted upon the axle, so as to swing rearward, as and for the purpose shown and set forth.

5. In a machine for gathering the ears and chopping the stalks of corn, the combination of the drive-wheel provided with a cog-wheel, the transverse shaft having a pinion meshing with the said cog-wheel, and having double cranks at its ends, connecting-rods journaled on the cranks, cross-pieces pivoted to the forward ends of said connecting-rods, tong-jaws pivoted upon the ends of the cross-pieces, and having inclined inner rear edges, pins bearing against the said inclined edges, and springs located between the forward portions of the jaws, as and for the purpose shown and set forth.

In testimony that I claim the foregoing as my own I have hereunto affixed my signature in presence of two witnesses.

CHARLES LOUIS DIRCKX.

Witnesses:
GEORGE FR. KUEUZLE,
GEORG. BEHA.